Oct. 27, 1953 M. G. CROSBY 2,657,359

FREQUENCY OR PHASE MODULATING SYSTEM

Filed Aug. 25, 1950

Inventor
Murray G. Crosby,
By
Pierce, Scheffler & Parker,
Attorneys.

Patented Oct. 27, 1953 2,657,359

UNITED STATES PATENT OFFICE 2,657,359

FREQUENCY OR PHASE MODULATING SYSTEM

Murray G. Crosby, New Hyde Park, N. Y., assignor to Boonton Radio Corporation, Boonton, N. J., a corporation of New Jersey Application August 25, 1950, Serial No. 181,484

9 Claims. (Cl. 332—19)

This invention relates to frequency or phase modulating systems including variable reactance tubes upon which a modulating voltage is impressed, and more particularly to modulating systems for tunable oscillators or amplifiers in which the modulation deviation is determined solely by the modulating potential and is independent of the tuning of the oscillator or amplifier.

This application is a continuation-in-part of my copending application Serial No. 708,408, filed November 7, 1946, which matured into Patent No. 2,521,694, on September 12, 1950. Modulator systems as contemplated by this invention are shown schematically in Fig. 11 of the patent.

The reactive effect of a conventional reactance tube across a capacitively or an inductively tuned circuit is such that the degree of modulation produced by a given modulation potential applied to the reactance tube has varied with the tuning of the oscillator or amplifier circuit. A constant modulation which is independent of tuning is desirable for various applications, for example in measuring and testing equipment such as a frequency or phase modulated signal generator.

Objects of the invention are to provide tunable frequency or phase modulation systems in which the modulation deviation is determined by the modulation voltage applied to a reactance tube and is constant over a wide range of tuning of the resonant circuit of an oscillator or amplifier. Objects are to provide tunable frequency or phase modulation systems or circuits in which the tunable circuits are of such construction and operational characteristics that, when associated with conventional reactance tubes, the frequency or phase deviation developed by a given modulating voltage on the reactance tube is independent of the tuning of the oscillator or amplifier circuit. More specifically, an object of the invention is to provide constant deviation modulating systems in which the tunable circuit of an oscillator or amplifier is of such construction, including simultaneously variable inductive and capacitive elements, that a reactance tube of simple conventional design affords a modulation deviation which is independent of the tuning of the tunable circuit. An object is to provide a frequency or phase modulation system in which the tunable frequency-determining circuit across which a reactance tube is connected includes simultaneously adjustable inductive and capacitive elements so related as to have a constant inductance-capacitance ratio over the tuning range of the circuit.

These and other objects and the advantages of the invention will be apparent from the following specification when taken with the accompanying drawing in which.

Figure 1:
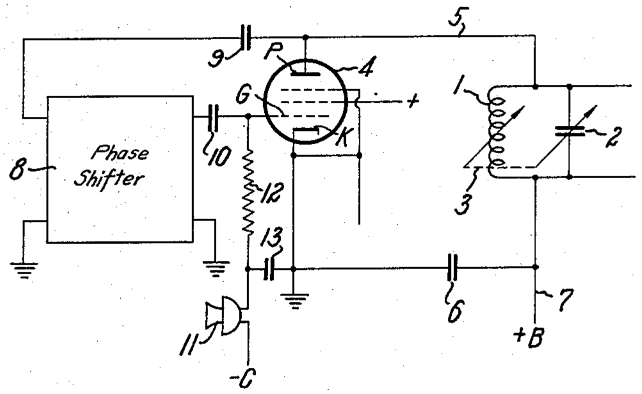
Fig. 1 is a schematic circuit diagram of a variable reactance tube embodying the invention, the diagram being substantially identical with Fig. 11 of the aforesaid prior application and patent.

In Fig. 1, the reference numerals 1 and 2 identify the inductive and capacitive elements of a frequency-determining circuit of an oscillator or amplifier tube, not shown, and the broken line 3 joining the arrows through these elements indicates that they are ganged for simultaneous adjustment to determine the operating frequency. The tuned circuit may be of the "butterfly" type described by Eduard Karplus in "Proceedings of the Institute of Radio Engineers," July, 1945, vol. 33, page 426; or the inductance 1 may be a variable inductor with a sliding contact or a permeability-tuned inductance, the adjustable element of the inductance being mechanically coupled by the link 3 with the shaft of a condenser having plates shaped to afford the desired related variation of inductance and capacitance for constant deviation over the tuning range.

A reactance tube 4 is effectively connected across the tuned circuit by a conductive connection 5 from one end of the inductance 1 to the plate P of the tube, and a coupling condenser 6 connected between the grounded tube cathode K and a lead 7 which extends from the other end of the inductance to a source of plate potential indicated by the symbol "+B." A simple two-element phase shifter 8 is connected between the plate P and ground through a blocking condenser 9, and the junction of the phase-shifter elements is connected to the grid G of tube 4 through a condenser 10. A negative bias voltage and a modulation voltage, for example from a source indicated schematically as a microphone 11, are applied to the grid G through a resistance 12 which may be by-passed to ground through a high frequency condenser 13.

Reference is made to the aforesaid prior patent for a detailed analysis of the conditions which must be satisfied for various reactance tube modulating system to render the deviation independent of the tuning of the tank circuit 1, 2. As there stated, if the reactance tube is of capacitive type with a simple two-element phase shifter, the capacitance 2 should be varied proportional to the resonant frequency, and the inductance 1 varied inversely proportional to the cube of the resonant frequency. For a reactance tube of inductive type, both the inductance and the capacitance should vary in inverse proportion to the resonant frequency, i. e. the tuned circuit should have a constant L/C ratio for constant deviation over the frequency range of the oscillator or amplifier.

Figure 2:
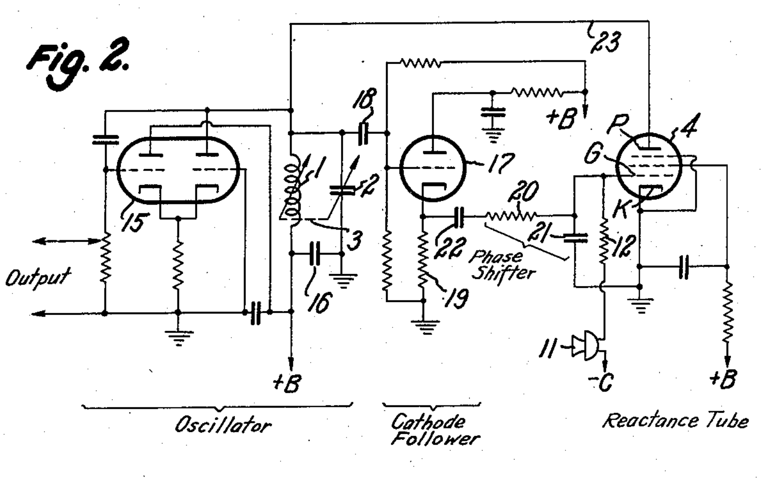
Fig. 2 is a detailed circuit diagram of a frequency modulating system embodying the invention.

A practical embodiment of a frequency modulated oscillator employing an inductive reactance tube and having a constant deviation characteristic is illustrated in Fig. 2. The oscillator may be of any desired type but preferably, and as illustrated, is of the constant amplitude, two-terminal oscillator coil type which is described and claimed in my prior Patent No. 2,269,417, granted January 6, 1942. One plate of the double triode 15, which may be a type 6J6 tube, is connected to one side of the tank circuit which comprises a variable inductor 1 and variable capacitor 2 ganged for simultaneous adjustment as indicated by the arrows connected by broken line 3, and the other side of the tank circuit is grounded by connecting one capacitor terminal directly to ground and connecting the corresponding terminal of the inductor 1 to ground through a large condenser 16 which has negligible impedance over the oscillator frequency range. A cathode follower stage is interposed between the tank circuit and the phase shifter to prevent loading of the tank circuit by the phase shifter and to provide a low source impedance for the phase shifting circuit. The high potential end of the tank circuit 1, 2 is connected to the grid of tube 17 of the cathode follower stage through a coupling condenser 18, and the oscillating voltage across the tank circuit is thereby reproduced across the cathode resistor 19 of the tube 17. A phase shifting circuit comprising a resistor 20 and capacitor 21 in series is connected across the cathode resistor 19 through a condenser 22 of low impedance at the oscillator frequencies, and the junction of resistor 20 and condenser 21 is connected to grid G of the reactance tube 4.

It is to be noted that the low source impedance for the phase shifting circuit which is provided by interposing a cathode follower stage between the tank circuit and the phase shifter permits use of a lower value resistor 20 and larger value capacitor 21 than would be otherwise practical, thus reducing the effects of stray reactances such as the shunt capacitance across the phase shifter resistor 20. For an oscillator tunable over the range of from about 5 to 21 megacycles, the tube 17 may be of type 6AB4 with a cathode resistor of 1500 ohms, and the phase shifter may comprise a resistor 20 of 3300 ohms and a capacitor 21 of 40 mmf. connected across resistor 19 through a condenser 22 of 0.001 microfarad.

The cathode K of reactance tube 4 is grounded, and plate P of the tube is connected to the high potential side of the tank circuit 1, 2 by a lead 23.

The voltage for effecting a frequency modulation of the oscillator output is impressed upon the grid G of the reactance tube 4 from an appropriate source, for example a microphone 11, through a resistor 12 in a grid-biasing circuit which, as indicated by the symbol "—C" imposes on the grid a steady potential which is negative with respect to the grounded cathode K of the tube. Various by-pass condensers and isolating or voltage-dropping resistors which are conventional in electron tube circuits are illustrated but are not specifically identified and described.

Figure 3:
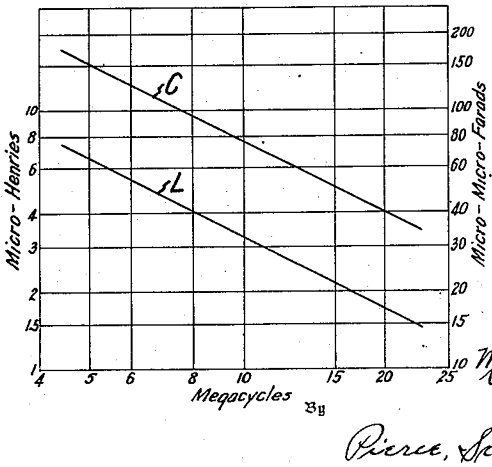
Fig. 3 is a curve sheet showing, with respect to the resonant frequency of the oscillator or amplifier circuit, the related values of the inductance and capacitance of the tuned circuit which afford a constant modulation when the reactance tube is of inductive type.

The tube 4 may be, and, in an embodiment of the invention, was a type 6AK5 tube. The illustrated phase shifter circuit conditions the tube 4 for operation as a variable inductance across the tank circuit of the oscillator. For constant frequency deviation over the oscillator tuning range at any given modulation voltage applied to reactance tube 4, the inductance L and capacitance C of the tank circuit must be simultaneously adjusted to vary in inverse proportion to the resonant frequency, i. e. to maintain a constant L/C ratio. Complementary values of the reactances for a tank circuit tunable over the range of from 5 to 20 megacycles are shown graphically by curves L and C of Fig. 3.

It is to be noted that the deviation for a given modulating voltage would vary directly with frequency if the tank circuit were tuned by adjustment of only the capacitor 2, and would vary inversely with frequency if only the inductance were adjusted for tuning of the tank circuit. The frequency deviation in the case of oscillators tunable over the range of from 5 to 20 megacycles would thus vary in the ratio of about 1 to 4, or 4 to 1, if the tank circuit were of conventional variable capacitance or variable inductance type. The tank circuit of constant inductance-capacitance ratio according to Fig. 3 affords substantially constant deviation over the tuning range and, in like manner, the tank circuit may be designed and constructed to afford constant deviation when the reactance tube is of capacitive type.

Although it is possible, and is usually preferable, to tune the tank circuit of the modulation system by simultaneous variations of the inductance and capacitance at such rates as to afford constant deviation of frequency or phase, the invention is not limited to circuits or modulation systems which afford an exact or even a close approximation to constant deviation. A negligible variation of deviation with tuning is of major importance in signal generators and is desirable, but not essential, in the case of transmitters adapted to operate at different frequencies or over a range of frequency. The invention therefore contemplates modulating systems in which the reactances of a tank circuit are simultaneously adjusted to eliminate and/or to reduce the deviation variation with tuning to less than that characteristic of capacitively or inductively tuned tank circuits.

It is to be understood that the invention is not limited to the particular circuit illustrated in Fig. 2 as the phase shifter elements may be reversed to condition the tube 4 for operation as a capacitive reactance, and the detail circuit arrangement of the oscillator or amplifier may be varied. As noted above, the capacitance C should vary with frequency and the inductance L should vary in inverse proportion to the cube of the resonant frequency when the reactance tube is of capacitive type.

I claim:

1. In a frequency or phase modulating system, the combination of a tunable frequency-determining circuit, a reactance tube shunted across said tunable circuit, and means for imposing a modulating voltage on said reactance tube; said circuit including a variable inductor shunted by a variable capacitor, and means ganging said inductor and capacitor for simultaneously adjusting the effective values thereof at relative rates with respect to the resonant frequency of said circuit to maintain over the tuning range a substantially constant deviation for a given modulating voltage on said reactance tube.

2. In a frequency or phase modulating system, the invention as recited in claim 1, wherein said reactance tube is of capacitive type, and said adjusting means varies the effective value of said capacitor linearly with the resonant frequency and varies the effective value of said inductor in inverse proportion to the cube of the resonant frequency.

3. In a frequency or phase modulating system, the invention as recited in claim 1, in combination with a cathode-follower stage connected across said tunable circuit and including a tube having a cathode resistor, and wherein said reactance tube has a control grid and plate cooperating with a cathode, and a two-element phase-shifter connected across said cathode resistor, one element of said phase-shifter being connected between said control grid and cathode of said reactance tube.

4. In a frequency or phase modulating system, the invention as recited in claim 1, wherein said reactance tube is of inductive type, and said adjusting means varies the effective values of both said capacitor and said inductor in inverse proportion to the resonant frequency.

5. In a frequency modulating system, the combination of an oscillator having a tunable frequency-determining circuit, a reactance tube of inductive type connected across said circuit, and means for imposing a modulating voltage on said reactance tube; said tunable circuit comprising a two-terminal inductor shunted by a capacitor, and means coupled mechanically to both said inductor and said capacitor for simultaneously adjusting the effective values of said inductor and capacitor to maintain a constant inductance-capacitance ratio over the tuning range of said circuit.

6. In a frequency modulation system, the invention as recited in claim 5, wherein said reactance tube includes a tube having a control grid and plate cooperating with a cathode, and a two-element phase-shifter comprising a resistance in series with a capacitance, said capacitance being connected between said control grid and cathode; and said phase-shifter being effectively connected across said tunable circuit.

7. In a frequency modulation system, the invention as recited in claim 6, in combination with a cathode follower stage comprising a tube having a control grid and plate cooperating with a cathode, a cathode resistor, and circuit means connecting the control grid and the plate end of said cathode resistor across said tunable circuit; and wherein said phase-shifter is connected across said cathode resistor.

8. In a frequency or phase modulation system, the combination of a tunable tank circuit, and a reactance tube shunted across said tank circuit and including a two-element phase shifter; said tank circuit including a variable inductive reactance and a variable capacitive reactance, and circuit-tuning means mechanically coupled to both of said reactances for simultaneously adjusting the effective values of said reactances to reduce the deviation variation with tuning to less than that resulting from adjustment of the effective value of only one of said reactances.

9. In a frequency or phase modulation system, the combination of a tunable tank circuit, an inductive reactance shunted across said tank circuit, and means for imposing a modulating voltage upon said inductive reactance; said tank circuit including a variable inductive and a variable capacitive reactance, and circuit-tuning means mechanically coupled to both of said reactances for simultaneously adjusting the effective values to maintain their inductance-capacitance ratio constant over the tuning range of said circuit.

MURRAY G. CROSBY.

References Cited in the file of this patent

UNITED STATES PATENTS

| Number | Name | Date |
|---|---|---|
| Re. 22,834 | Alvira | Jan. 28, 1947 |
| 2,269,417 | Crosby | Jan. 6, 1942 |
| 2,342,708 | Usselman | Feb. 29, 1944 |
| 2,521,694 | Crosby | Sept. 12, 1950 |